US012785347B1

(12) United States Patent
Rothenberg et al.

(10) Patent No.: US 12,785,347 B1
(45) Date of Patent: Nov. 3, 2026

(54) COMPACT FLAT LENS SAMPLING OPTIC FOR COHERENT BEAM COMBINATION

(71) Applicant: NORTHROP GRUMMAN SYSTEMS CORPORATION, Falls Church, VA (US)

(72) Inventors: Joshua E. Rothenberg, Los Angeles, CA (US); Juan Montoya, Redondo Beach, CA (US)

(73) Assignee: Northrop Grumman Systems Corporation, Falls Church, VA (US)

(*) Notice: Subject to any disclaimer, the term of this patent is extended or adjusted under 35 U.S.C. 154(b) by 506 days.

(21) Appl. No.: 18/527,494

(22) Filed: Dec. 4, 2023

(51) Int. Cl.

| | |
|---|---|
| ***H01S 3/10*** | (2006.01) |
| ***G02B 5/18*** | (2006.01) |
| ***H01S 3/00*** | (2006.01) |
| ***H01S 3/067*** | (2006.01) |
| ***H01S 3/13*** | (2006.01) |
| ***H01S 3/23*** | (2006.01) |

(52) U.S. Cl.
CPC .......... *H01S 3/0675* (2013.01); *G02B 5/1885* (2013.01); *H01S 3/0071* (2013.01); *H01S 3/06754* (2013.01); *H01S 3/10015* (2013.01); *H01S 3/2383* (2013.01); *H01S 3/005* (2013.01); *H01S 3/10053* (2013.01); *H01S 3/1305* (2013.01); *H01S 3/2308* (2013.01)

(58) Field of Classification Search
CPC .... H01S 3/005; H01S 3/0071; H01S 3/10015; H01S 3/10053; H01S 3/1305; H01S 3/2308; H01S 3/2383
See application file for complete search history.

(56) References Cited

U.S. PATENT DOCUMENTS

| | | | | |
|---|---|---|---|---|
| 5,926,494 | A * | 7/1999 | Pepper | H01S 3/094 372/70 |
| 7,468,832 | B2 | 12/2008 | Rothenberg et al. | |
| 8,958,145 | B2 | 2/2015 | Rothenberg | |
| 2007/0201795 | A1* | 8/2007 | Rice | H01S 3/005 385/39 |
| 2008/0037028 | A1* | 2/2008 | Cheung | H01S 3/2383 356/478 |
| 2012/0188626 | A1* | 7/2012 | Rothenberg | H01S 3/06712 359/239 |
| 2021/0101823 | A1* | 4/2021 | Goodno | C03B 37/15 |

* cited by examiner

*Primary Examiner* — Michael Carter
(74) *Attorney, Agent, or Firm* — John A. Miller; Shumaker, Loop & Kendrick, LLP

(57) ABSTRACT

A laser amplifier system including a seed beam source, a beam splitter splitting the seed beam into a plurality of amplification channels, a phase modulation device changing the phase of the beam in each channel, and an amplifying device provided amplifying the seed beam in each channel, where all of the amplified seed beams are transmitted into space as a coherently combined output beam. The system further includes an FZG optic having at least one ring pattern formed into one or both of surfaces of the optic, where the pattern focusses a sample beam from one or more of the amplified seed beams to a focus point. The system further includes a detector for measuring the intensity of the sample beam, and a controller responsive to the measured intensity of the sample beam, where the controller controls the phase modulation devices to control the phase of the amplified seed beams.

20 Claims, 4 Drawing Sheets

COMPACT FLAT LENS SAMPLING OPTIC FOR COHERENT BEAM COMBINATION

BACKGROUND

Field

This disclosure relates generally to a coherent beam combining (CBC) laser amplifier system and, more particularly, to a CBC laser amplifier system including a Fresnel zone grating (FZG) optic providing beam sampling for output beam phase locking.

Discussion

High power laser amplifiers have many applications including industrial, commercial, military, etc. Designers of laser amplifiers are continuously investigating ways to increase the power of the laser amplifier for these and other applications. One known type of laser amplifier is a fiber laser amplifier that employs a doped fiber, such as a ytterbium (Yb) doped fiber, erbium (Er) doped fiber or a thulium (Tm) doped fiber, that receives a seed beam and a pump beam that amplifies the seed beam and generates the high power laser beam, where the fiber has an active core diameter that may be about 10-20 μm or larger. Another type of laser amplifier is a semiconductor diode laser amplifier, which generally operates at much lower powers than fiber laser amplifiers. Laser systems may employ multiple laser amplifiers that combine the amplified beams in some fashion to generate higher powers. A design challenge for any high power laser amplifier system of this type is to combine the beams from a plurality of laser amplifiers in a manner so that the beams provide a single beam output having a uniform phase over the beam diameter such that the beam can be focused to a small focal spot, where focusing the combined beam to a small spot at a long distance (far-field) defines the quality of the beam.

In one known multiple laser amplifier design, coherent beam combining (CBC) is employed. A master oscillator (MO) generates a seed beam that is split into a plurality of split seed beams each having a common wavelength, where each seed beam is amplified by, for example, a fiber amplifier or diode amplifier. The amplified seed beams from an array of beams that are then directed to a diffractive optical element (DOE), or an array of lenses or other optical elements, that combines the coherent amplified beams into a single output beam. The DOE has a periodic structure formed into the element so that when the individual amplified beams each having a slightly different angular direction are redirected by the periodic structure all of the beams diffract from the DOE in the same direction. In the laser embodiment with an array of lenses or other optical elements the array of beams remain parallel and continue to propagate as an array of closely packed beams. In CBC laser systems, a small sample of the combined array of beams is provided to a detection and control sub-system to ensure the beams in the array are phase-locked together so as to form a beam that focuses to the diffraction limit, or a close to the diffraction limit as possible. It is generally desirable that laser amplifier systems of this and other types be packaged to be small, light-weight and cost effective as reasonably possible. Improvements in laser amplifier designs to obtain these and others goals are constantly being made.

DETAILED DESCRIPTION OF THE EMBODIMENTS

The following discussion of the embodiments of the disclosure directed to a CBC laser amplifier system including a Fresnel zone grating (FZG) optic providing beam sampling for output beam phase locking is merely exemplary in nature, and is in no way intended to limit the disclosure or its applications or uses.

Figure 1:
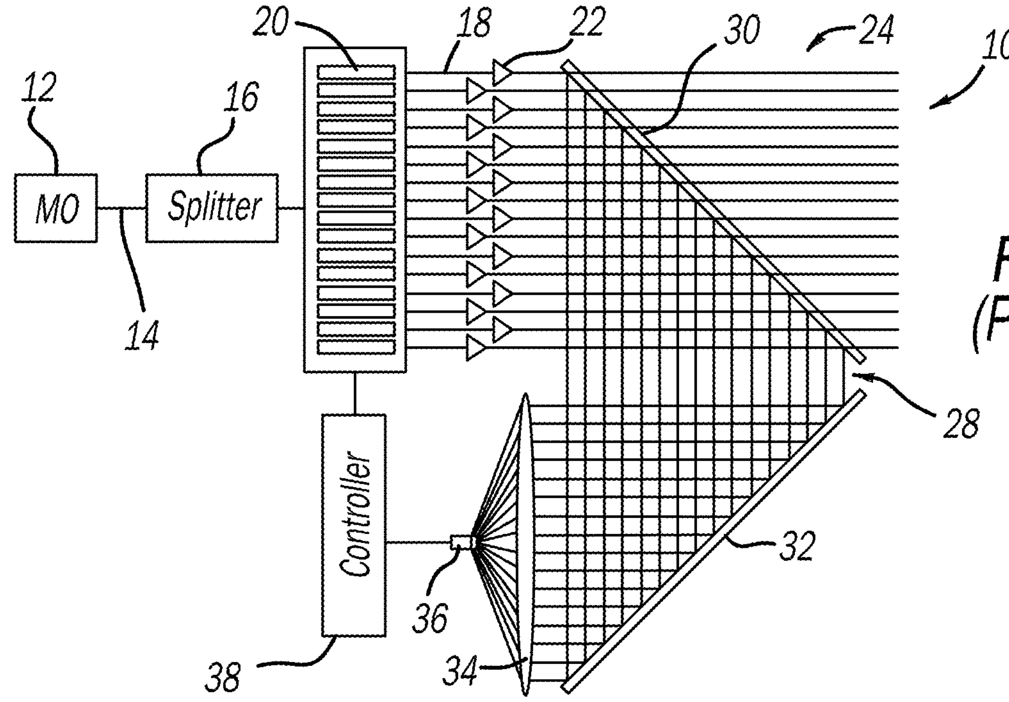
FIG. 1 (Prior Art)
FIG. 1 is a simplified illustration of a known CBC laser amplifier system showing beam sampling for output beam phase locking.

FIG. 1 is a simplified illustration of a known CBC fiber amplifier system 10 that shows a representation of the known multichannel phase control technique having a single photodetector configured to simultaneously detect the phases of multiple laser channels mentioned above. The system 10 includes a master oscillator (MO) 12, such as a single-longitudinal mode distributed feedback (DFB) diode laser oscillator, that generates a low power seed beam having a certain wavelength λ on a fiber 14 and a beam splitter 16 that splits the seed beam into a number of amplification channels 18. Each split seed beam in each channel 18 is sent to an electro-optic modulator (EOM) 20, or other suitable phase modulating device, that is controlled in any suitable manner, such as by LOCSET or SPGD, so that all of the amplified seed beams are phase-locked together. Although a separate EOM 20 is provided for each channel 18 in the system 10, it may be possible to employ an integrated multi-channel EOM that is able to provide phase control for more than one seed beam. The phase controlled seed beam is provided to a suitable amplifying device 22 in each channel 18, such as a fiber amplifier, diode amplifier, etc., that amplifies the seed beam that is then emitted into space so that all of the amplified beams form a tightly packed array of beams that are emitted in a common direction and are phase-locked to combine and provide a coherent output beam 24.

In order to provide the phase locking between the amplified beams in each channel 18 so that the output beam 24 has maximum focusable power, a low power sample beam 28 from the output beam 24 is directed by a beam splitter 30 towards folding optics 32 and to a lens or other suitable optics 34 that directs the sample beam 28 onto a detector 36 to be measured. Without loss of generality, the use of the terms lens and optics in this context may be understood to refer to any optical system that causes the individual channel beams within the sample beam 28 to spatially overlap with one another on the detector 36. The detector 36 converts the sample beam 28 to an electrical signal that is sent to a controller 38. Generally for the SPGD phase control method, a small and unique phase change is applied to each seed beam by the EOMs 20 through the controller 38. The sample light from the channels 18 will interfere with each other on the detector 36 and a certain amount or intensity of photocurrent will be output from the detector 36 based on that beam interference. The phase setpoint of the seed beams is changed so that the interference of the sample light on the detector 36 changes and the thus the intensity of the photocurrent changes, which provides a modulated intensity signal to the controller 38. That intensity modulation is correlated with the phase setpoint applied to each channel 18 in the controller 38, where the phase setpoints are changed to maximize the intensity of the electrical signal from the detector 36 indicating that the amplified beams are in phase with each other. In the LOCSET phase control method, modulations in the electrical signal from the detector 36 are also used to measure, adjust and lock the beam phases together.

CBC laser amplifier systems of this type can have many amplification channels, for example, thousands of channels, in order to increase the power of the output beam 24 for certain applications. It is often difficult as a result of noise, bandwidth limitations, processing limitations, etc. to control many of the EOMs 20 to provide proper phase control of the amplified beams using the techniques discussed above. As mentioned above, it is known in the art to provide "nested" phase control of the amplified beams in these laser amplifier systems, where the phase of groups of the amplified beams are separately controlled to be the same and the phase of all of the groups of amplified beams are controlled to be the same, which reduces the phase control processing, enabling higher bandwidth of phase control.

Figure 2:
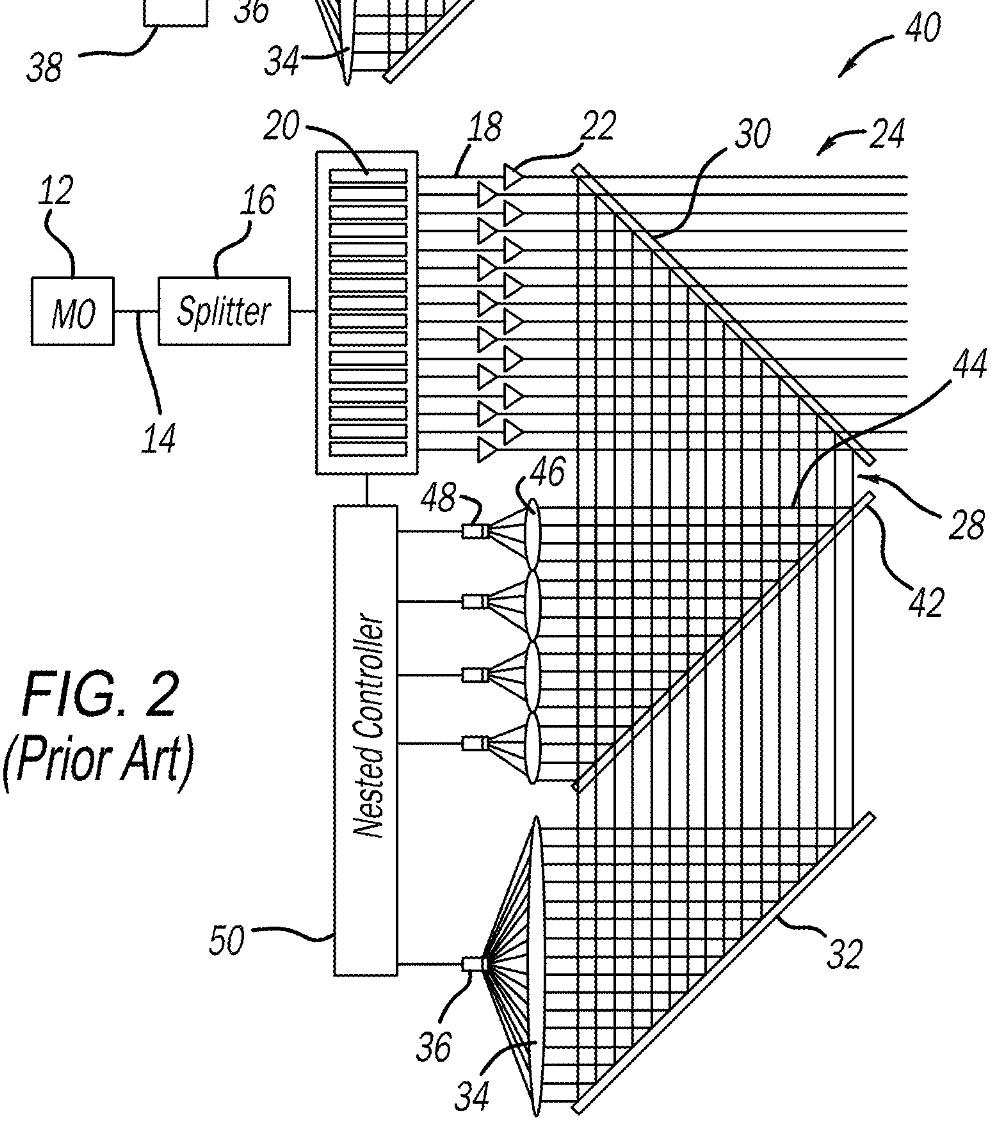
FIG. 2 (Prior Art)
FIG. 2 is a simplified illustration of a known CBC laser amplifier system showing beam sampling for nested output beam phase locking.

FIG. 2 is a simplified illustration of a known CBC laser amplifier system 40 that provides this type of nested phase control of the amplified beams, where like elements to the system 10 are identified by the same reference number. In this design, the sample beams are grouped into a certain number of spatially adjacent sample beams, here four groups of four beams each, where a portion of the sample beam 28 is split off by a beam splitter 42. A group of four adjacent sample beams 44 is focused by a separate lens 46 onto a separate detector 48 and the intensity electrical signal from each detector 48 for each group is provided to a nested controller 50, which controls the phase of the seed beams using the EOMs 20 in the manner discussed above so that the sample beams 44 in each group are in phase with each other independent of the phase of the sample beams 44 in the other groups. The intensity electrical signal from the detector 36 is also sent to the nested controller 50, which provides a phase dither to the seed beams as discussed above, but only controls the phase of the separate groups of the seed beams. This reduces the amount of phase control required to control the phase of all of the beams together.

As is apparent, for a large array of amplified beams the beam splitter 30 and the lens 34 need to be relatively large and thus can add significant volume and weight to the systems 10 and 40. Further, the size of the systems 10 and 40 are also driven by the focal length of the lens 34, and thus for a compact system, a small focal length (or F#, i.e., the ratio of focal length to aggregate combined beam diameter) is desired, which can be difficult and expensive to fabricate for large beams.

This disclosure proposes replacing the beam splitter 30, the folding optics 32 and the lens 34 with one or more flat FZG optics. The FZG optics includes one or more FZG ring patterns formed in a substrate, where the pattern includes a series of concentric circular grooves or rings forming a circular grating. The depth of the rings determines the fraction of beam array power that is sampled and focused, the spacing between and width of the rings determines the focal length of the FZG optic, and the center of the circular ring pattern determines the location of the focal point. The FZG optics focuses a small fraction of the power from groups of beams in the array to be detected as part of a phase control system. The FZG optics enables complex arrangements of sampling groups of beams for 'nested' phased control architectures, where smaller groups of beams are phase locked with each other in one nested layer, and then the groups are phase locked to each other in a next higher layer. The FZG optics approach is very compact and leverages existing high precision and cost-efficient semiconductor photomask fabrication tools. Although multiple separate flat optics may be employed, multiple regions of separate FZG optics may be overlapped on a single surface, and/or on the front and back surfaces of a single flat optic, reducing the optics count, volume, and simplifying the system.

Figure 3:
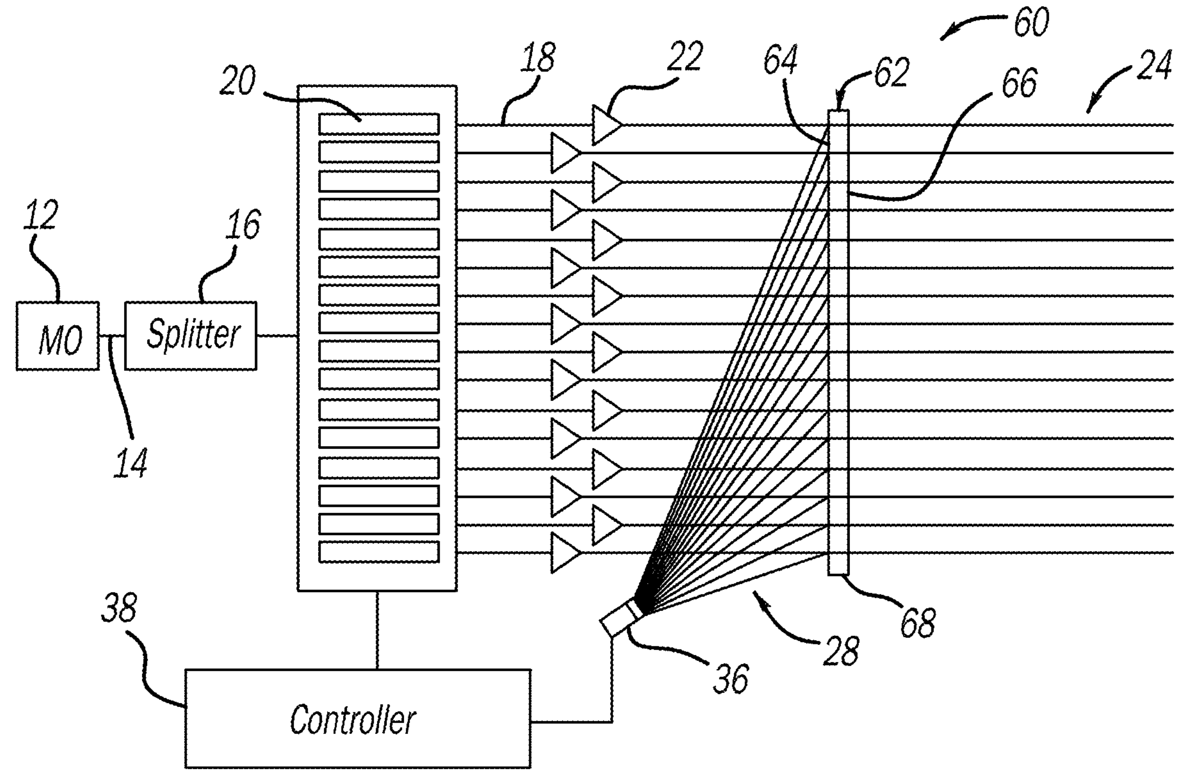
FIG. 3 is a simplified illustration of a CBC laser amplifier system including a reflective FZG optic providing beam sampling for output beam phase locking.

FIG. 3 is a simplified illustration of a CBC laser amplifier system 60, where like elements to the system 10 are identified by the same reference number. In the system 60, the beam splitter 30, the folding optics 32 and the lens 34 have been replaced with a flat FZG optic 62 that does not need to be tilted. The FZG optic 62 includes a specially configured FZG ring pattern etched into a front surface 64 and/or a back surface 66 of a suitable substrate 68, such as fused silica or other transparent material, that focusses the sample beam 28 onto the detector 36, as will be discussed in detail below, where the thickness of the substrate 68 can be as thin as desired and still accommodate the etched rings. Antireflective coatings are provided on both of the surfaces 64 and 66 and optimized so that there are no or very small reflections therefrom that would otherwise reduce beam power or interfere with the light focused by the FZG ring pattern, while providing adequate power for detection.

Figure 4:
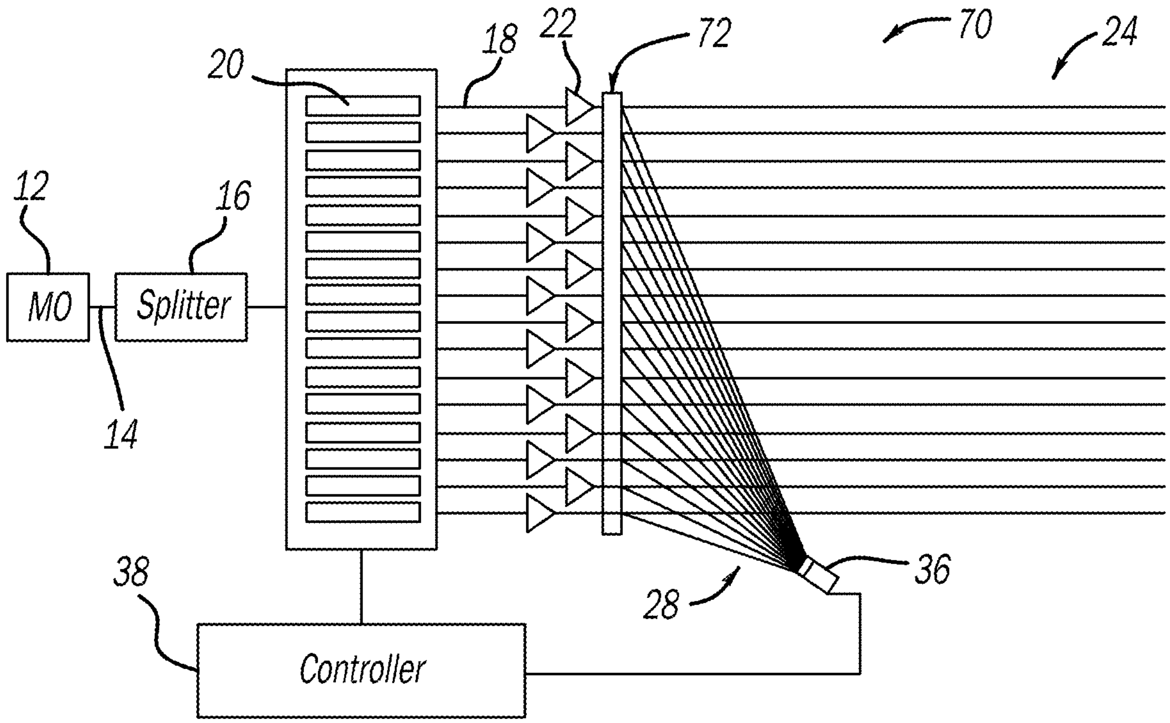
FIG. 4 is a simplified illustration of a CBC laser amplifier system including a transmissive FZG optic providing beam sampling for output beam phase locking.

The system 60 shows the FZG optic 62 being configured to reflect the sample beam 28. In an alternate embodiment, the FZG optic can be configured as a transmissive element. FIG. 4 is a simplified illustration of a CBC laser amplifier system 70 illustrating this embodiment, where like elements to the system 10 are identified by the same reference number. Particularly, the FZG optic 62 has been replaced with an FZG optic 72 that directs the focused sample beam 28 forward of the optic 72. In this case, the anti-reflective coatings would be optimized to minimize any reflection, since the sample beam is transmitted. This generally is accomplished by increasing the etched depth of the rings in the FZG pattern. It is noted that the position of the FZG optics 62 and 72 can be provided closer to or farther away from the amplifying devices 22 as desired for packaging depending on where the detector 36 is located. The system 70 shows the FZG optic 72 being closer to the amplifying devices 22 than the FZG optic 62 because accommodation does not need to be made for the sample beam 28 being reflected back.

Figure 5:
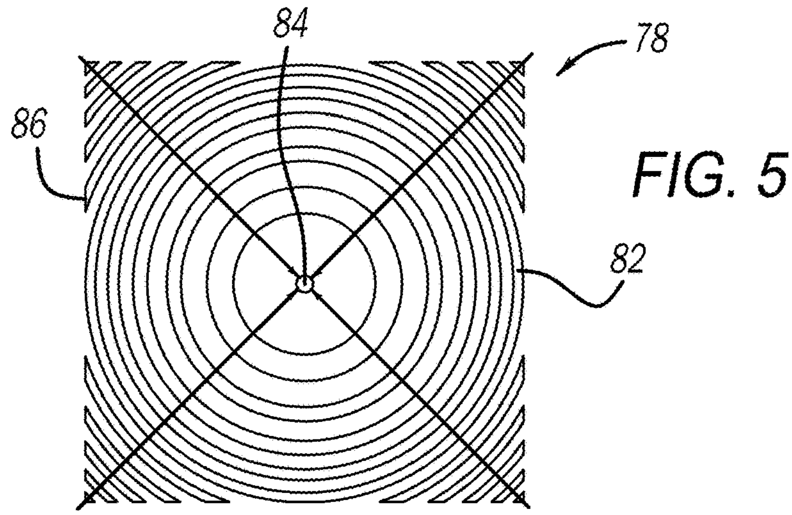
FIG. 5 is a front view of a centered FZG ring pattern showing beam focusing.
Figure 6:
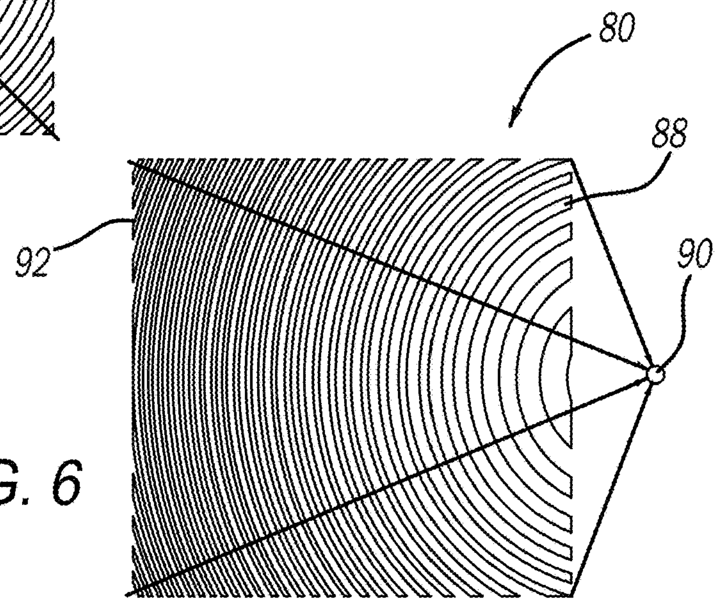
FIG. 6 is a front view of an offset FZG ring pattern showing beam focusing.
Figure 7:
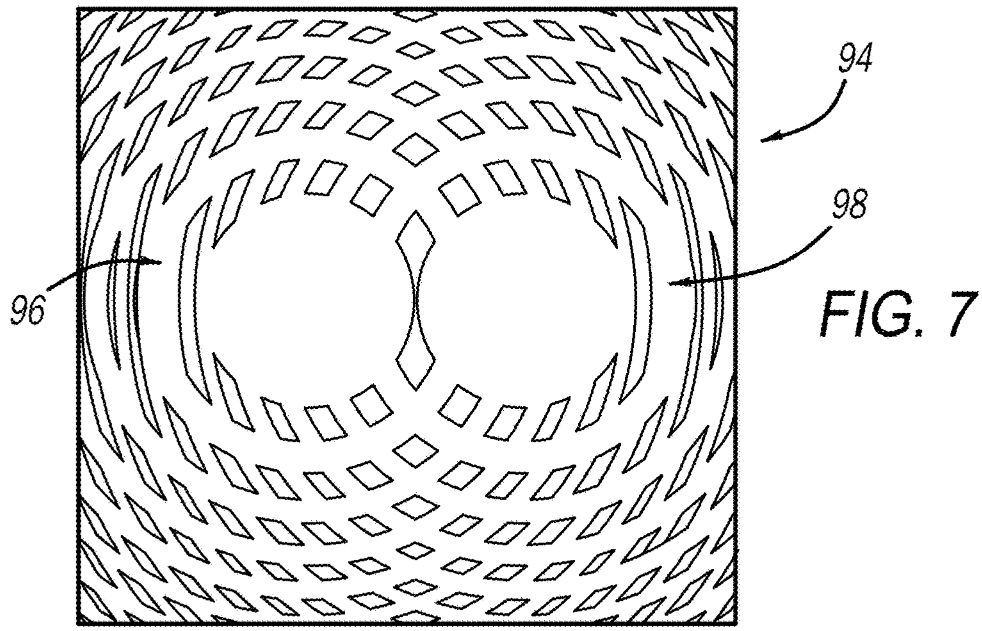
FIG. 7 is an illustration of two overlapping FZG ring patterns on a single surface.

The FZG optics 62 and 72 are flat focusing diffractive optical elements based on a Fresnel zone lens pattern. FIGS. 5 and 6 show two examples of a Fresnel zone lens ring pattern 78 and 80, respectively, to illustrate the location where the beam is focused opposite the center of the FZG ring patterns 78 and 80. As shown in FIG. 6, the center of the ring pattern 80 can be outside of the etched region, and the focus will still be opposite to the center of the ring pattern 80. The FZG ring pattern 78 includes a series of concentric Fresnel ring zones 82 having a width that decreases from a center 84 of the lens pattern 78 to an outer edge 86 of the lens pattern 78. Likewise, the FZG ring pattern 80 includes a series of concentric Fresnel ring zones 88 having a width that decreases from a center 90 of the lens pattern 80 to an outer edge 92 of the lens pattern 80. FIG. 7 shows an FZG optic 94 including two overlapping FZG ring patterns 96 and 98 on a single surface. In a single etch process, either the light or dark regions in FIGS. 5-7 are etched to a depth h as described in reference to equation (2) below, and the optic 94 then produces two foci aligned with their respective ring centers.

The radii $r_n$ of the edges of the etched Fresnel ring zones, i.e., the transitions from light to dark regions in FIGS. 5-7, is determined by:

$$r_n^2 = nF\lambda + (n\lambda/2)^2 (n = 1, 2, \ldots), \tag{1}$$

where F is the desired focal length of the FZG optic 62 or 72 and λ is the wavelength of the sample beam 28.

The alternating Fresnel zones are etched into the front and/or back surface of the FZG optic 62 or 72 to a depth h that determines the diffraction efficiency of the optic 62 or 72 according to:

$$\eta_{FZG} = 4R\sin^2(\varphi/2)/\pi^2 \tag{2}$$

where R is the surface reflectivity of the substrate 68, which may be reduced by an anti-reflection coating, and where the phase shift φ of the grooves is $\varphi = 4\pi h/\lambda$.

For the FZG optic 72 providing the transmissive configuration, the groove phase shift is:

$$\varphi = 2\pi(n-1)h/\lambda, \tag{3}$$

where n is the index of refraction of the substrate 68.

For a beam to be sampled by the FZG optic 62/72 at normal incidence, the focus of the optic 62/72 will be aligned with the center of the ring pattern. Thus, in the systems 60 and 70, the center of the FZG ring pattern must be below the optic 62 or 72 to create the focus at the detector 36, which is necessary to avoid interference with the forward propagating beam array.

Of significant importance to a compact arrangement of laser amplifier components is the ability to achieve a very short focal length with the FZG optic. With conventional aspherical optics there is a practical limit to a lens F# (focal length/diameter) of ~1, and fast optics, i.e., low F#, can be difficult to fabricate and expensive at larger diameters. However, the FZG optics F# is only limited by the photomask tool resolution for optics fabrication, which in the current standard commercial mask product limits groove width to ~0.4 mm (period ~0.8 μm). This allows for FZG diffracted ray angles to approach 90° to the surface normal for visible or infrared wavelengths, and thus enables focusing with F#<<1, and a highly compact system.

For a nested system laser system architecture as discussed above, multiple FZG ring patterns and possibly multiple FZG optics may be employed to separately focus the sample beams in each group of beams to a separate detector, and focus multiple groups of beams to other detectors. Any suitable configuration of the FZG ring patterns can be employed, where the particular FZG ring pattern is positioned so that the particular sample beam is directed to the desired FZG ring pattern. The various FZG ring patterns can be overlapping and formed on the same side or different sides of the same substrate or on the same side or different sides of multiple substrates or optics. Overlapped FZG ring patterns can be located on the same surface of an FZG optic with some loss of efficiency, or can be located on the back of the same optic, or on a separate flat sampling optic placed adjacent to the first optic.

Figure 8:
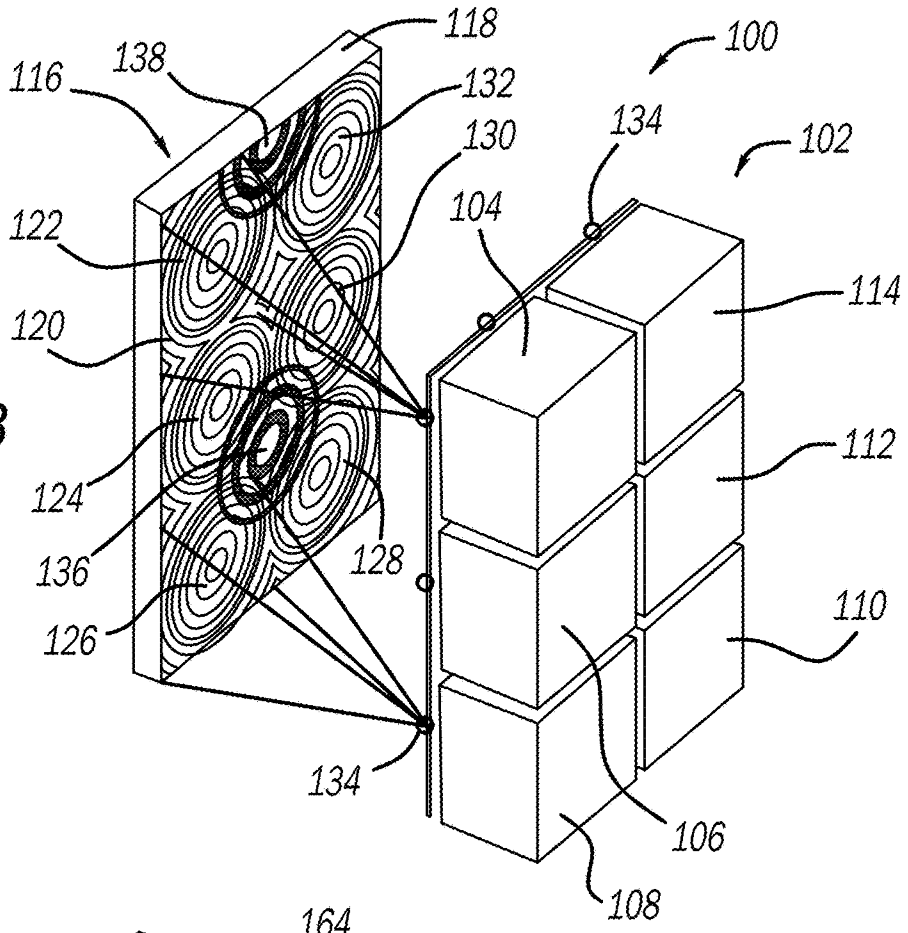
FIG. 8 is an illustration of part of a CBC laser amplifier system including multiple FZG ring patterns on a common surface providing beam sampling for nested output beam phase locking.

FIG. 8 is an illustration of part of a CBC laser amplifier system 100 depicting a nested type of phase control similar to that discussed above. The system 100 includes a diode laser amplifier array 102 having six stacked and adjacent diode laser amplifier assemblies 104, 106, 108, 110, 112 and 114 each including 1D or 2D arrays of diode amplifiers (not shown) that amplify a seed beam as discussed above. The system 100 also includes an FZG optic 116 having a substrate 118 with a surface 120 facing the array 102. Six non-overlapping FZG ring patterns 122, 124, 126, 128, 130 and 132 are etched into the surface 120 at a location adjacent to each other so that the FZG ring pattern 122 receives the sample beams from the diode laser amplifier assembly 104, the FZG ring pattern 124 receives the sample beams from the diode laser amplifier assembly 106, the FZG ring pattern 126 receives the sample beams from the diode laser amplifier assembly 108, the FZG ring pattern 128 receives the sample beams from the diode laser amplifier assembly 110, the FZG ring pattern 130 receives the sample beams from the diode laser amplifier assembly 112 and the FZG ring pattern 132 receives the sample beams from the diode laser amplifier assembly 114. The FZG ring patterns 122, 124, 126, 128, 130 and 132 are configured and the centers of the FZG ring patterns 122, 124, 126, 128, 130 and 132 are positioned on the substrate 118 so that they each focus the respective sample beams to separate detectors 134 indicated by small circles. Therefore, the FZG ring patterns 122, 124, 126, 128, 130 and 132 are employed to provide phase control of the amplified beams in each respective separate diode laser amplifier assembly 104, 106, 108, 110, 112 and 114.

An FZG ring pattern 136 is etched into the surface 120 at a location where it overlaps the FZG ring patterns 124, 126, 128 and 130 and receives the sample beams from the diode laser amplifier assemblies 106, 108, 110 and 112, and an FZG ring pattern 138 is etched into the surface 120 at a location where it overlaps the FZG ring patterns 122 and 132 and receives the sample beams from the diode laser amplifier assemblies 104 and 114. The FZG ring patterns 136 and 138 are configured so that they focus the sample beams to separate detectors (not shown). The FZG ring pattern 136 is used to phase-lock the groups of amplified beams from the diode laser amplifier assemblies 106, 108, 110 and 112 and the FZG ring pattern 138 is used to phase-lock the groups of amplified beams from the diode laser amplifier assemblies 104 and 114. Another FZG ring pattern (not shown) would be needed to phase-lock the groups of amplified beams from the two separately phase-locked groups of diode laser amplifier assemblies 106, 108, 110 and 112 and 104 and 114. The detectors 134 are necessarily located outside of all of the beam paths to avoid interference with the beams, and are opposite the center of their respective FZG ring pattern.

Figure 9:
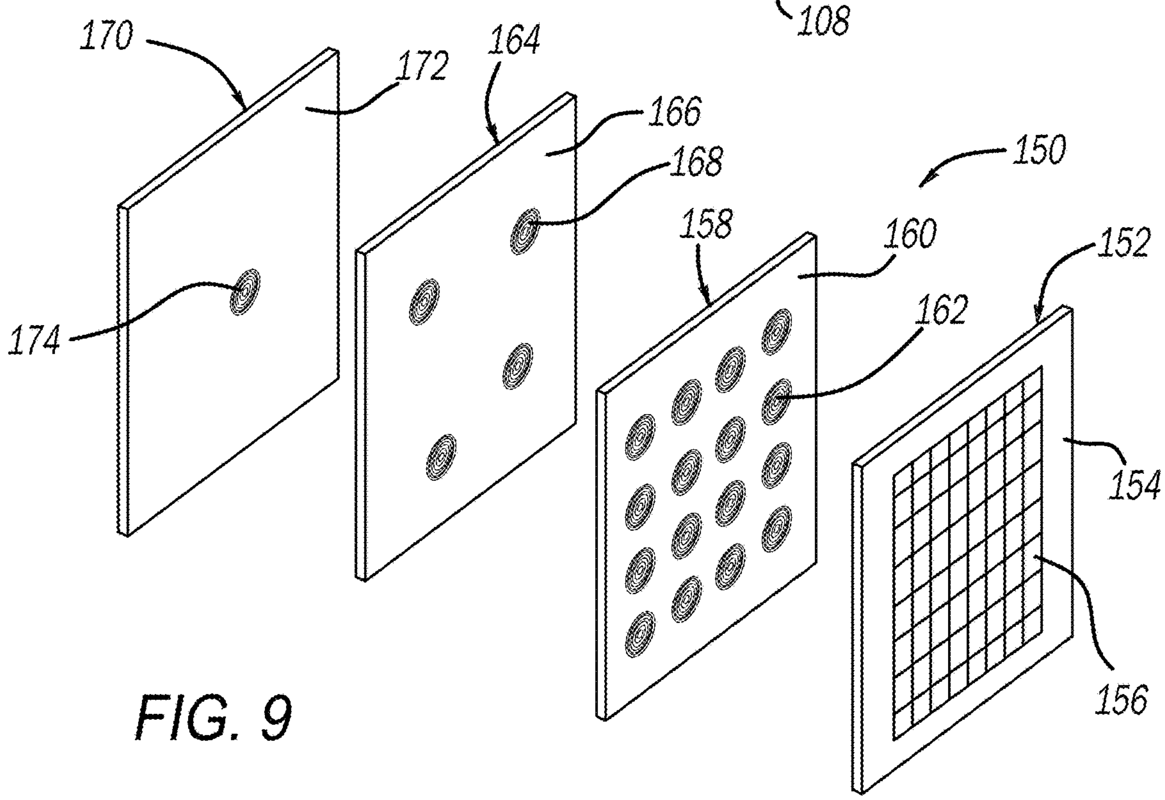
FIG. 9 is an illustration of an FZG optical assembly that is part of a nested phase control system for a CBC laser amplifier system.

FIG. 9 is an illustration of an FZG optic assembly 150 that is part of a nested phase control system for a CBC laser amplifier system and that focusses sample beams in a nested configuration having nested layers of FZG optics for beam phase control according to another embodiment. The assembly 150 includes a first FZG optic 152 having a substrate 154 in which sixty-four FZG ring patterns 156 have been etched, a second FZG optic 158 having a substrate 160 in which sixteen FZG ring patterns 162 have been etched, a third FZG optic 164 having a substrate 166 in which four FZG ring patterns 168 have been etched, and a fourth FZG optic 170 having a substrate 172 in which one FZG ring pattern 174 has been etched. The first FZG optic 152 focuses the sample beams from each pattern 156 to sixty-four separate detectors (not shown) to phase lock each of those sixty-four sample beams. The second FZG optic 158 focuses the sample beams from sixteen groups of four adjacent FZG ring patterns 156 to sixteen separate detectors (not shown) to phase lock those sixteen sample beams. The third FZG optic 164 focuses the sample beams from four groups of sixteen adjacent ring patterns 156 to four separate detectors (not shown) to phase lock those four sample beams. The fourth FZG optic 170 focuses the sample beams from the four groups of sixteen adjacent FZG ring patterns 156 to a single detector (not shown) to phase lock all sixty-four groups of sample beams together.

The foregoing discussion discloses and describes merely exemplary embodiments of the present disclosure. One skilled in the art will readily recognize from such discussion and from the accompanying drawings and claims that various changes, modifications and variations can be made therein without departing from the spirit and scope of the disclosure as defined in the following claims.

What is claimed is:

1. A laser amplifier system comprising:

a seed beam source providing a seed beam;

a beam splitter splitting the seed beam into a plurality of amplification channels;

a phase modulation device provided in each channel and being operable to change the phase of the seed beam;

an amplifying device provided in each channel and being operable to amplify the seed beam, wherein all of the amplified seed beams are transmitted into space as a coherently combined output beam;

at least one Fresnel zone grating (FZG) optic positioned to receive the amplified seed beams, said at least one FZG optic including a substrate having a first surface facing the amplifying devices, a second surface opposite to the amplifying devices and at least one FZG ring pattern formed into one or both of the surfaces, said at least one FZG ring pattern focusing a sample beam from one or more of the amplified seed beams to a focus point;

at least one detector positioned at or near the focus point and measuring the intensity of the sample beam; and a controller responsive to an intensity signal of the sample beam from the at least one detector, said controller controlling the phase modulation devices so as to control the phase of the amplified seed beams.

2. The system according to claim 1 wherein the at least one FZG ring pattern is a reflective pattern that reflects the focused sample beam.

3. The system according to claim 1 wherein the at least one FZG ring pattern is a transmissive pattern that transmits the focused sample beam.

4. The system according to claim 1 wherein the first and second surfaces are flat.

5. The system according to claim 1 wherein the at least one FZG ring pattern is a plurality of FZG ring patterns and the at least one detector is a plurality of detectors, where each FZG ring pattern focuses the sample beams from different groups of the amplified seed beams to a separate one of the detectors.

6. The system according to claim 5 wherein the plurality of FZG ring patterns are layered as nested groups of FZG ring patterns.

7. The system according to claim 6 wherein the intensity signals from the detectors are used by the controller to control different groups of amplified seed beams so as to control the phases of all of the groups of amplified seed beams.

8. The system according to claim 6 wherein the at least one of the plurality of FZG ring patterns that focuses the sample beams from more than one group of the amplified seed beams is a group of the plurality of FZG ring patterns.

9. The system according to claim 8 wherein at least one of the plurality of FZG ring patterns focuses the sample beams from all of the groups of the amplified seed beams.

10. The system according to claim 5 wherein at least one of the plurality of FZG ring patterns focuses the sample beams from more than one group of the amplified seed beams to a separate one of the detectors.

11. The system according to claim 5 wherein the at least one FZG optic is one FZG optic and wherein all of the plurality of FZG ring patterns are formed in one of the first or second surfaces of the substrate.

12. The system according to claim 5 wherein the at least one FZG optic is a plurality of FZG optics and wherein the plurality of FZG ring patterns are formed in one of the first or second surfaces of the substrate in each of the FZG optics.

13. The system according to claim 1 wherein the amplifying devices are fiber amplifiers or diode amplifiers.

14. A laser amplifier system comprising:

a seed beam source providing a seed beam;

a beam splitter splitting the seed beam into a plurality of amplification channels;

one or more phase modulation devices being operable to change the phase of the seed beams;

an amplifying device provided in each channel and being operable to amplify the seed beam;

a Fresnel zone grating (FZG) optic positioned to receive the amplified seed beams, said FZG optic including a substrate having a first surface facing the amplifying devices, a second surface opposite to the amplifying devices and a plurality of FZG ring patterns formed into one or both of the surfaces, wherein each FZG ring pattern focusses a sample beam from one or more of the amplified seed beams to a focus point;

a plurality of detectors each being positioned at or near one of the focus points and measuring the intensity of sample beams; and a controller responsive to intensity signals of the sample beams from the detectors, said controller controlling the one or more phase modulation devices so as to control the phase of the amplified seed beams, wherein the intensity signals from the detectors are used by the controller to control different groups of amplified seed beams so as to control the phases of all of the groups of amplified seed beams.

15. The system according to claim 14 wherein the plurality of FZG ring patterns are layered as nested groups of FZG ring patterns.

16. The system according to claim 15 wherein at least one FZG ring pattern focuses a sample beam from at least one group of sample beams to one detector and at least one other FZG ring pattern focuses a sample beam from at least one other group of sample beams to another detector so as to control the phases of all of the amplified seed beams in all of the groups.

17. The system according to claim 14 wherein each FZG ring pattern focuses the sample beams from different groups of the amplified seed beams to a separate one of the detectors in a nested configuration.

18. The system according to claim 17 wherein at least one of the plurality of FZG ring patterns focuses the sample beams from more than one group of the amplified seed beams to a separate one of the detectors.

19. A laser amplifier system comprising:

a seed beam source providing a seed beam;

a beam splitter splitting the seed beam into a plurality of amplification channels;

a plurality of phase modulation devices being operable to change the phase of the seed beams;

an amplifying device provided in each channel and being operable to amplify the seed beam;

a Fresnel zone grating (FZG) optic positioned to receive the amplified seed beams, said FZG optic including a substrate having a first surface facing the amplifying devices, a second surface opposite to the amplifying devices and a plurality of FZG ring patterns formed into one or both of the surfaces, wherein each FZG ring pattern focusses a sample beam from one or more of the amplified seed beams to a focus point, wherein the plurality of FZG ring patterns are layered as nested groups of FZG ring patterns;

a plurality of detectors each being positioned at or near one of the focus points and measuring the intensity of sample beams, wherein at least one FZG ring pattern focuses a sample beam from at least one group of sample beams to one detector and at least one other FZG ring pattern focuses a sample beam from at least one other group of sample beams to another detector; and a controller responsive to intensity signals of the sample beams from the detectors, said controller controlling the phase modulation devices so as to control the phase of the amplified seed beams.

20. The system according to claim 19 wherein the amplifying devices are fiber amplifiers or diode amplifiers.

* * * * *